United States Patent [19]
Wenner et al.

[11] Patent Number: 5,522,191
[45] Date of Patent: Jun. 4, 1996

[54] MULTI-PANE WINDOW ASSEMBLY WITH SINGLE-SIDED FRAME

[75] Inventors: Daniel A. Wenner; Ricky J. Mason; Robert M. Pabreza, all of Lawrenceburg, Tenn.; Aaron M. Tiede, Utica, Mich.

[73] Assignee: Excel Industries, Inc., Elkhart, Ind.

[21] Appl. No.: 334,727

[22] Filed: Nov. 4, 1994

[51] Int. Cl.$^6$ ..................................... E06B 3/32
[52] U.S. Cl. .................. 52/204.51; 52/208; 49/489.1; 296/146.1; 296/201
[58] Field of Search ............................. 52/204.51, 208, 52/209; 296/93, 201, 84.1, 152, 146.1, 146.3; 49/453, 489.1, 374, 463

[56] References Cited

U.S. PATENT DOCUMENTS

| | | | |
|---|---|---|---|
| 2,597,539 | 5/1952 | Smart | 52/204.51 |
| 2,701,162 | 2/1955 | Kliger | 52/204.51 |
| 2,721,361 | 10/1955 | Ryan et al. | 52/204.51 |
| 2,721,636 | 10/1955 | Ordorica et al. | 52/204.51 |
| 3,478,475 | 11/1969 | Strack . | |
| 4,571,278 | 2/1986 | Kunert | 52/208 X |
| 4,591,204 | 5/1986 | Gallitzendoerfer et al. . | |
| 4,606,159 | 8/1986 | Kunert . | |
| 4,723,809 | 2/1988 | Kida et al. . | |
| 5,154,028 | 10/1992 | Hill et al. . | |
| 5,171,051 | 12/1992 | Yoda | 52/208 X |
| 5,228,740 | 7/1993 | Saltzmann | 296/201 X |

FOREIGN PATENT DOCUMENTS 92306923  6/1994  European Pat. Off. .

Primary Examiner—Carl D. Friedman
Assistant Examiner—W. Glenn Edwards
Attorney, Agent, or Firm—Banner & Allegretti, Ltd.

[57] ABSTRACT

A window assembly for mounting in a recessed window opening, especially as the rear window in the passenger compartment of a pickup truck or other motor vehicle, has slidable and fixed positioned panes, preferably right-side and left-side fixed positioned panes with a slidably mounted center pane between them. A mounting frame including a molded plastic, single-sided frame member supports the fixed positioned pane(s) by adhesive surface bonding to a perimeter portion of the interior surface of the panes. The peripheral edge and the exterior surface of the fixed position pane(s) are free of adhesive bonding to the single-sided frame member. The mounting frame also provides an exterior show surface substantially flush with the exterior surface of the fixed position pane(s). The window assembly presents, therefore, an overall flush surface appearance with exposed peripheral edge surfaces of the fixed positioned pane(s). The exposed exterior show surfaces can be presented as an exterior surface portion of an applique having a portion embedded in the molded, single-sided frame member. A weather seal unitary with the single-sided frame member can be provided as a radially outward extending lip about the circumference of the frame, recessed from the plane of the exterior surface of the fixed positioned pane(s).

12 Claims, 10 Drawing Sheets

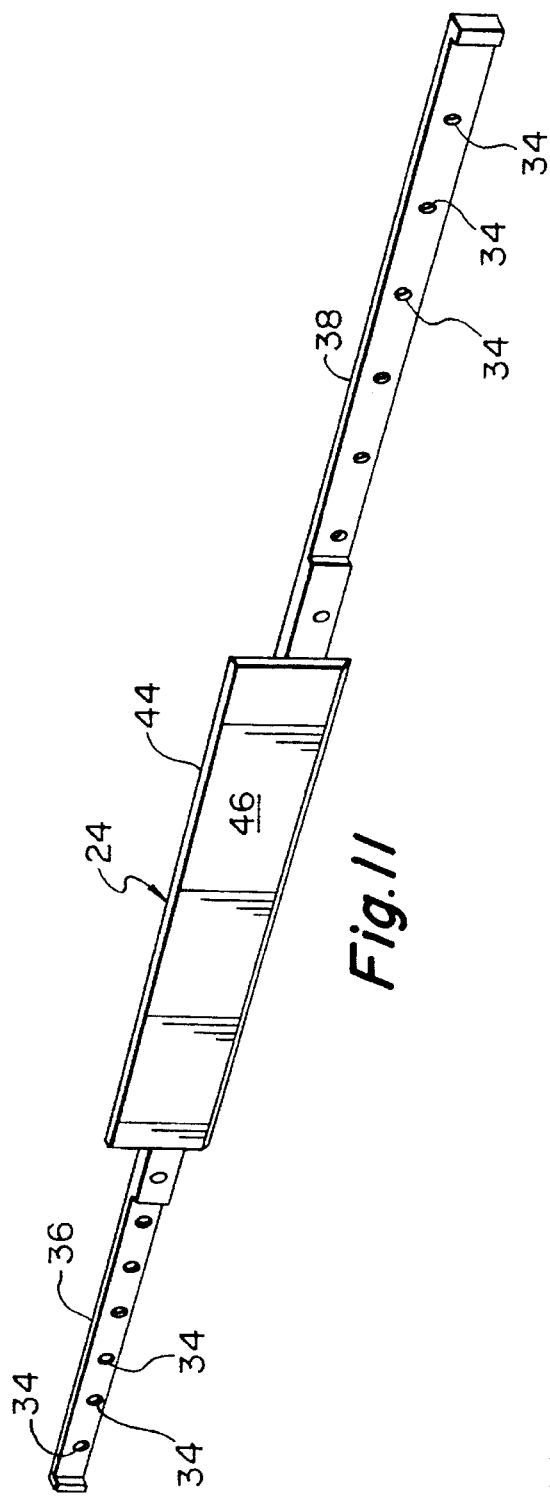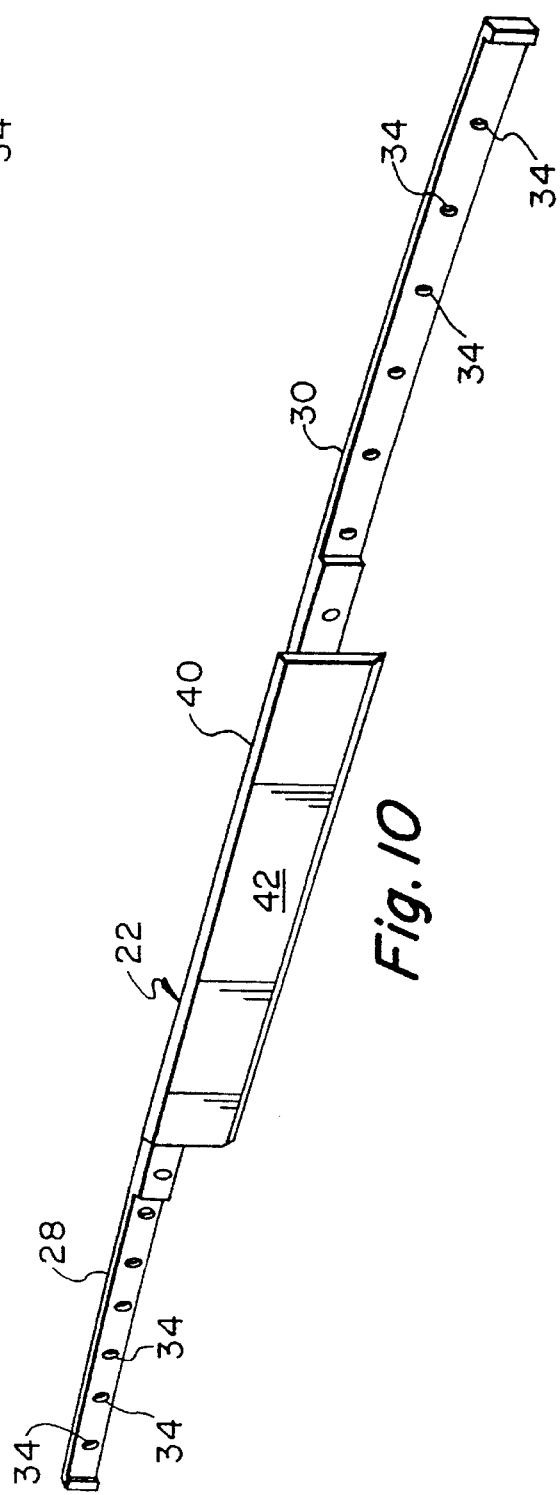

MULTI-PANE WINDOW ASSEMBLY WITH SINGLE-SIDED FRAME

INTRODUCTION

The present invention is directed to multi-pane window assemblies suitable for use, for example, in motor vehicle bodies, and to the manufacture of such window assemblies. In particular, the invention is directed to multi-pane window assemblies presenting a substantially flush appearance in a window opening, supporting both sliding and fixed panes.

BACKGROUND OF THE INVENTION

Window assemblies which are pre-assembled prior to installation are widely used in motor vehicle manufacture and other applications. Pre-assembly of the glazing unit for simple insertion into a window opening in a vehicle body during vehicle assembly has been found to yield substantial cost and quality advantages. Such window assemblies intended for use as rear windows for pickup truck cabs, for example, typically include a frame holding one or more fixed panes and a slidable pane. In the past, windows assemblies have had an undesirably bulky appearance poorly integrated into tile exterior surface of the vehicle.

As the exterior surfaces of vehicles, including pickup trucks and the like, have grown progressively smoother and more aerodynamic, a need has developed for window assemblies suitable to present a correspondingly more integrated and flush appearance. In particular, it has become desirable to provide multi-pane window assemblies wherein at least one pane is slidably mounted, which can be integrated into a recessed window opening to provide a substantially flush overall appearance.

It is an object of the present invention to provide multi-pane modular window assemblies having fixed and slidably mounted panes, presenting a substantially flush overall appearance. For motor vehicles, improved window assemblies with slidable panes are needed, which are preassembled prior to installation in the window opening, particularly as the rear window of the cab portion of a pickup truck vehicle body. It is an object of the present invention to provide such window assemblies having a slidable pane, integrated with one or more fixed panes, which are readily preassembled and are suitable for meeting strict fit and finish requirements and aesthetics requirements prevalent in motor vehicle glazing applications. Additional objects and features of the invention will be apparent from the following disclosure and detailed discussion of preferred embodiments.

SUMMARY OF THE INVENTION

In accordance with a first aspect of the invention, a window assembly is provided for mounting in a recessed window opening, for example, a recessed window opening in a motor vehicle body. The window assembly has a transparent, fixed position pane and a transparent, slidably mounted pane which, in its closed position, is laterally adjacent the fixed position pane. Directional references used herein will, for convenience and consistency of description, assume a window assembly :mounted as the rear window in the cab or passenger compartment of a motor vehicle, such as a pickup truck or the like. Thus, an interior surface of the window is a forward surface which faces into the passenger compartment. An exterior surface faces rearward of the vehicle. The lateral directions are right and left as one faces from the back to the front of the vehicle. The window assembly further has a mounting frame comprising a full-circumference, molded, single-sided frame member supporting the fixed position and slidably mounted panes. The frame member is single-sided in the sense that it supports the one or more fixed position panes by adhesive surface bonding to the interior surface of the pane, leaving the peripheral edge surface and the exterior surface of the pane free of adhesive bonding and, most preferably, free of any attachment means. That is, the single-sided frame member supports the fixed position panes by adhesive surface bonding to a perimeter portion of the pane's interior surface only. For this reason, a highly desirable, substantially flush appearance can be obtained, with the fixed position pane having a "raw" or exposed peripheral edge surface in close proximity to an adjacent sheet metal or other vehicle body panel, and its exterior surface substantially following the contour of the adjacent body panel.

According to another aspect of the invention, the mounting frame provides an exposed exterior surface of the window assembly. More particularly, the mounting frame provides an exposed exterior surface which is substantially flush with the exterior surface of the one or more fixed position panes. The aforesaid highly desirable substantially flush appearance provided by the single-sided mounting of the fixed position panes is thus furthered by the exposed exterior surface portion of the mounting frame. In accordance with certain particularly preferred embodiments, a full-circumference, one-piece, molded plastic single-sided frame member has an upper horizontal section to which an upper applique is affixed. The upper applique extends horizontally from above a right-side fixed position pane to above a left-side fixed position pane, with a center portion providing the aforesaid exposed exterior flush surface. The exposed exterior flush surface provided by the applique extends between the right-side fixed position pane and the left-side fixed position pane and is substantially flush with their exterior surfaces. Similarly, a lower applique affixed to a lower horizontal portion of the full-circumference, one-piece, single-sided frame member provides an exposed exterior surface extending between the bottom of the right-side and left-side fixed position panes, again being flush with the exterior surfaces of those panes.

It should be understood that any plane or surface which lies in a plane may be either flat or curvoplaner as that term is understood by those who are skilled in the art. Accordingly, a surface which is substantially flush with the exterior of a curved glass pane may follow that curved plane, i.e., lie in or near the curved plane as the surface of the glass. Surfaces are substantially flush, as that term is used herein, if they have a generally flush appearance as used in the environment or context of the intended application of the window assembly. Thus, for example, in the case of a pickup truck rear window assembly, the exposed exterior surface of the mounting frame would be substantially flush, as that term is used herein, with the curvoplaner surface of adjacent fixed position panes, if such mounting frame surface was within about one centimeter or, more preferably, one-half centimeter, most preferably within about two millimeters of an imaginary extension of the curved plane of the fixed pane. More generally, in the context of a motor vehicle application, substantially flush means that the exposed exterior surface of the frame means meets the specifications of the motor vehicle manufacturer for a substantially flush appearance.

Those who are skilled in the technology of modular and encapsulated window assemblies will recognize that a substantial technical advance is achieved by the present invention. Most notably, the window assembly can be mounted into a window opening recess to provide an appearance of being substantially flush with the sheet metal or other vehicle body panels surrounding the window opening, around the entire circumference of the assembly. The single-sided bonding in combination with the exposed exterior flush surface of the mounting frame can provide a substantially full-circumferential flush surface for an aesthetically pleasing integrated appearance in the vehicle body. In addition, those who are skilled in this area of technology will appreciate from the discussion below of certain preferred embodiments that a substantial weight and cost save can be achieved through the one-sided frame member, in view of the reduction in material which would be required for two or three-sided bonding around the peripheral edge of the fixed position panes. In addition, unitary weather seals, such as disclosed in commonly owned U.S. Pat. No. 5,154,028 can be provided as a radially outward extension of the one-sided frame member to abut sidewalls of a vehicle window recess.

The window assembly also lends itself to novel fabrication techniques which constitute additional aspects of the invention. As disclosed and described further below, fixed position panes and appliques providing the aforesaid exposed exterior surface can be positioned within a molding cavity, followed by introduction of curable polymeric material to form a full-circumference, one-piece, self-supporting frame member, integrating the panes with it by single-sided surface bonding and also appliques by enveloping portions thereof. Additional features and advantages of the invention will be understood from the following detailed description of certain preferred embodiments.

BRIEF DESCRIPTION OF THE DRAWINGS

Certain preferred embodiments are described and discussed in detail below in association with the appended drawings, wherein:

FIG. 10 is a schematic perspective view of the upper applique of the window assembly of FIG. 1; and FIG. 11 is an enlarged perspective view of the lower applique of the window assembly of FIG. 1.

Figure 1:
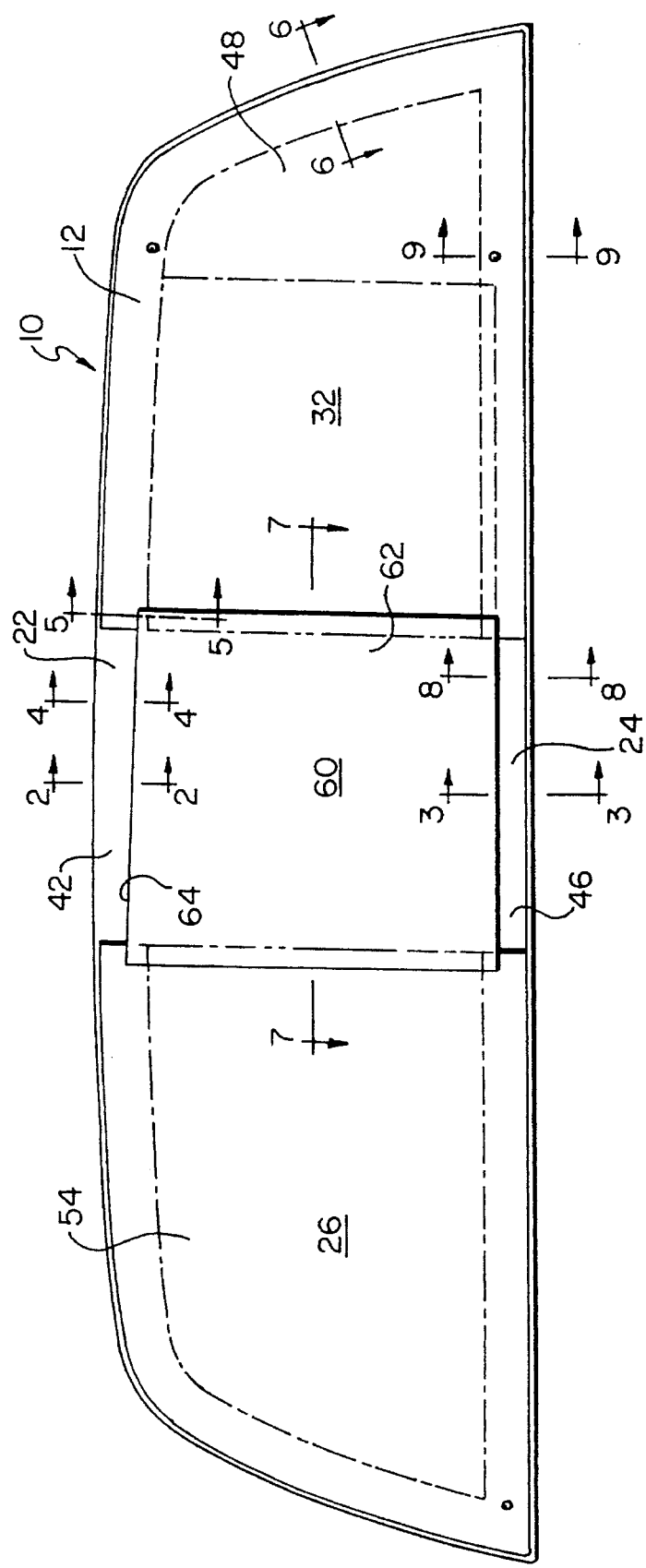
FIG. 1 is a schematic plan view of a motor vehicle window assembly in accordance with a preferred embodiment of the invention.
Figure 2:
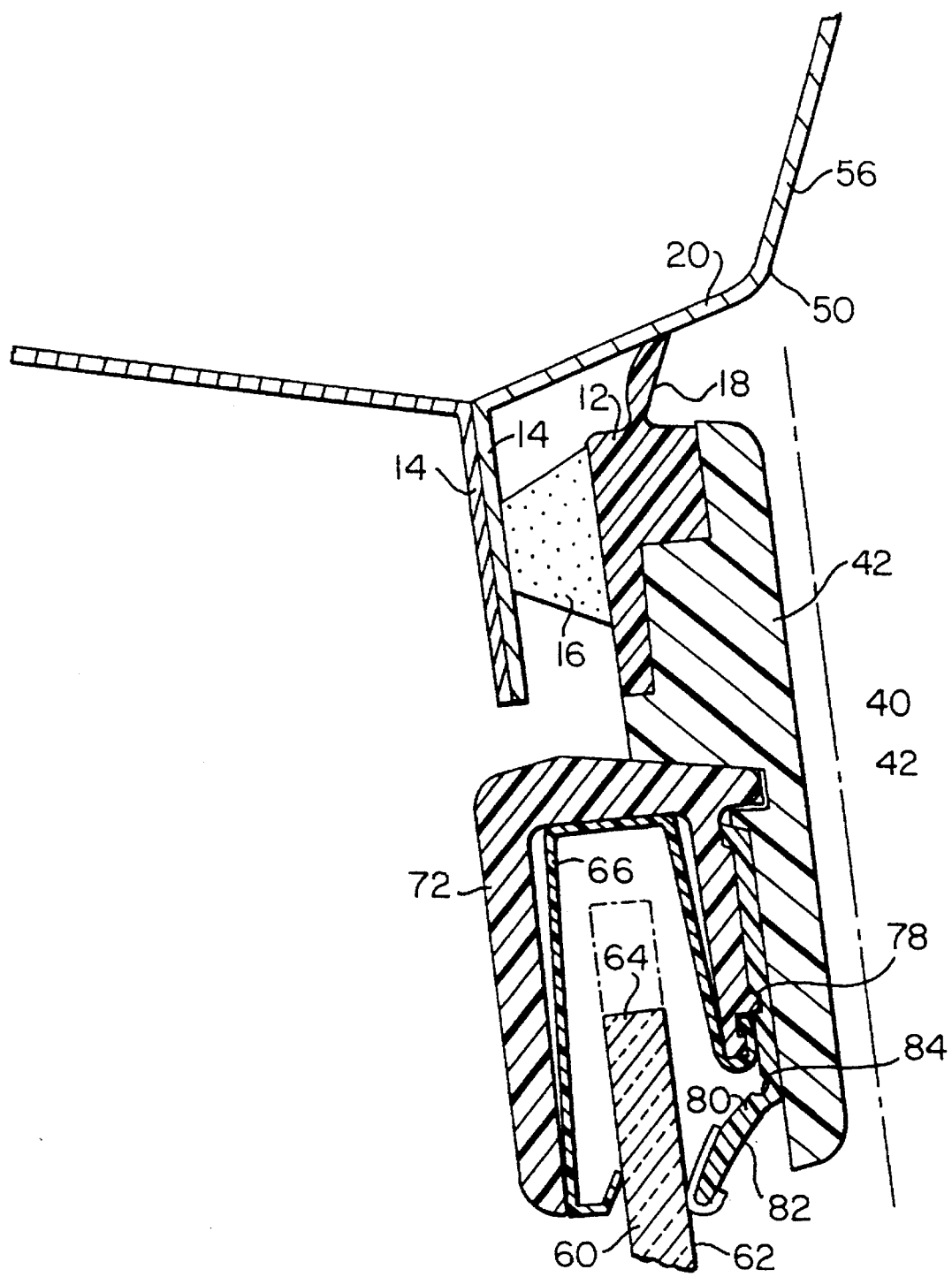
FIG. 2 is an enlarged schematic section view taken through line 2—2 of FIG. 1.
Figure 3:
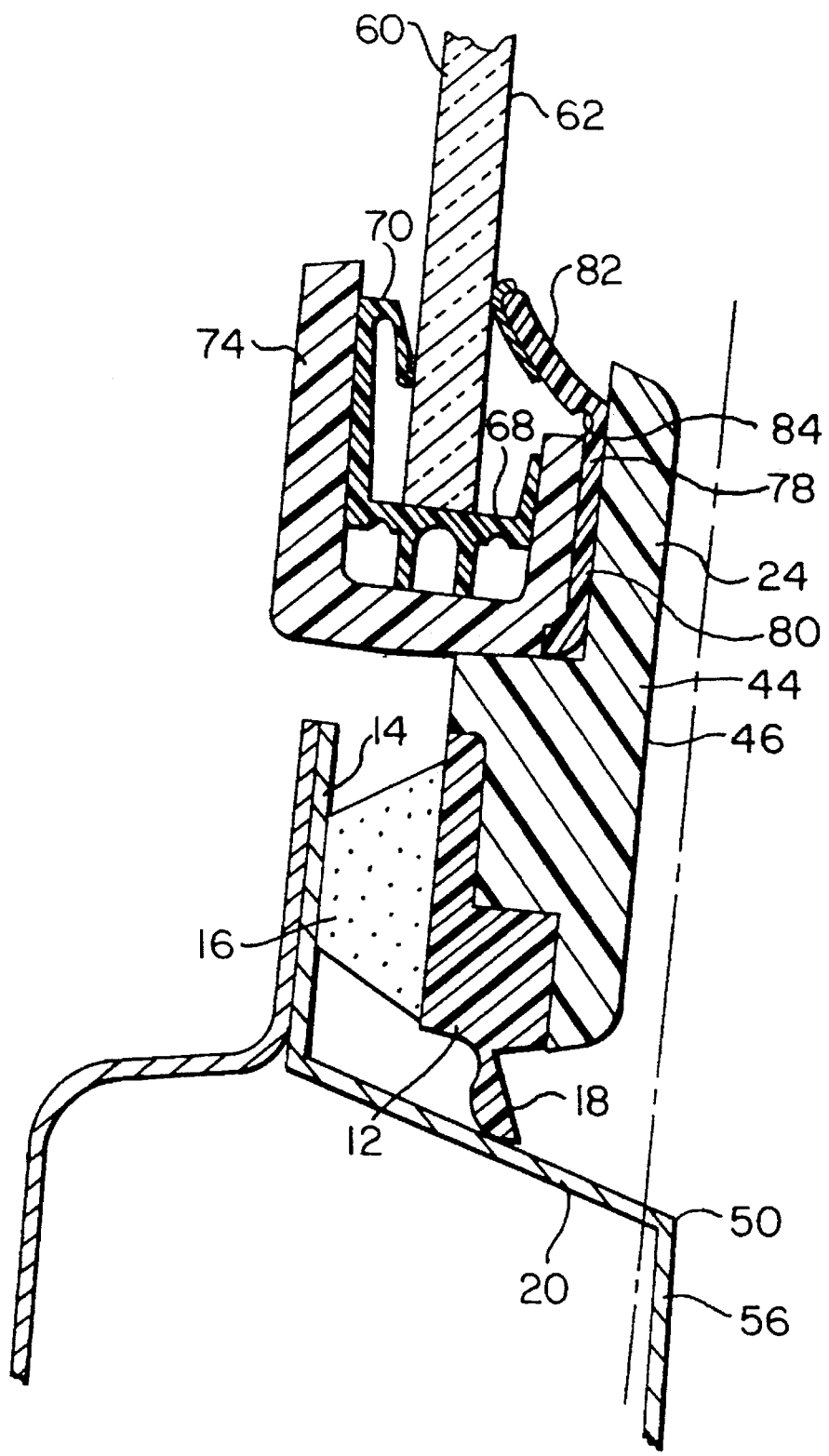
FIG. 3 is an enlarged schematic section view taken through line 3—3 of FIG. 1.
Figure 4:
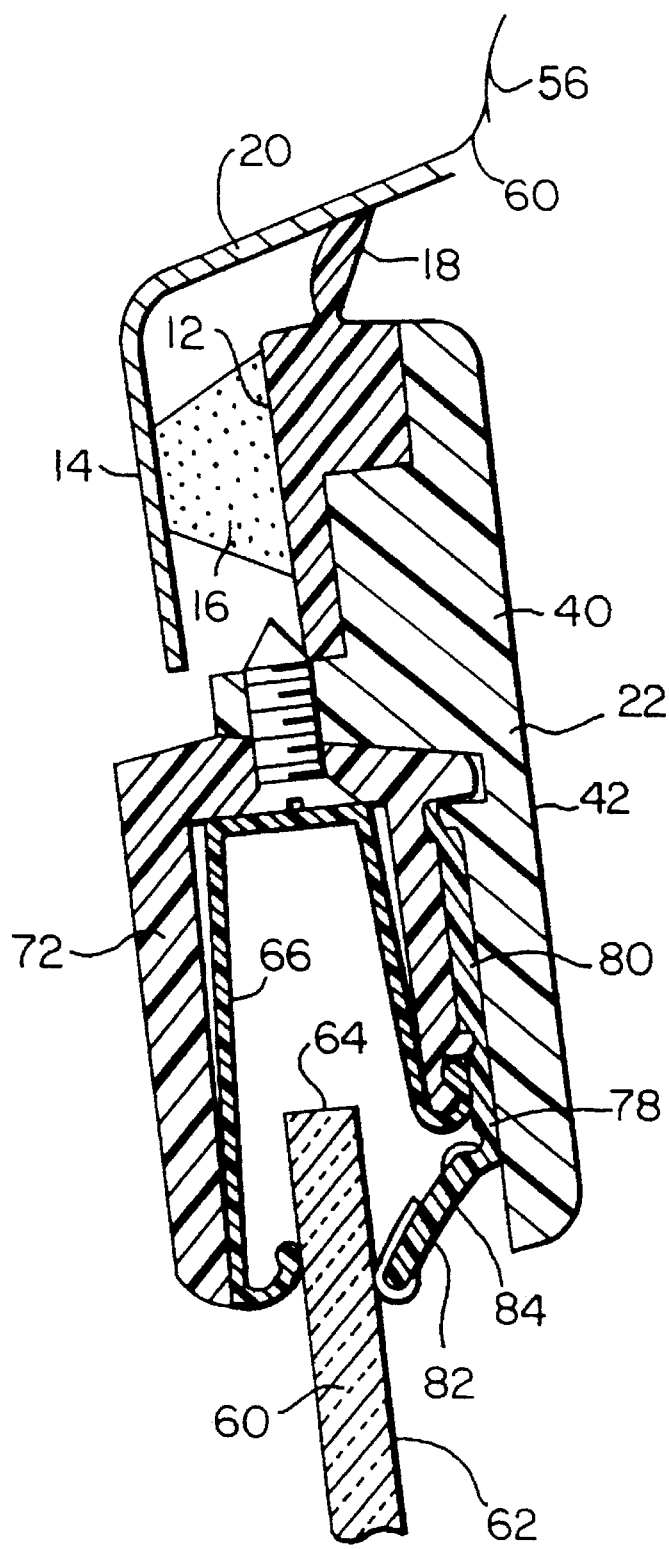
FIG. 4 is an enlarged schematic section view taken through line 4—4 of FIG. 1.

The figures referred to above are not drawn necessarily to scale and should be understood to present a simplified representation of the invention, illustrative of the basic principles involved. Window assemblies of the invention used commercially will have configurations and components determined, in part, by the intended application and use environment. Some features of the window assembly depicted in the accompanying figures have been enlarged or distorted relative to others to facilitate visualization and understanding. In particular, thin features may be thickened and long features may be shortened. References to direction and position, unless otherwise indicated, refer to the orientation of the window assembly illustrated in the drawings. Consistent with the description of directional references provided above, "forward" means toward the front of the vehicle; "rearward" means toward the rear of the vehicle, "right-side" means the passenger side of the vehicle (for vehicles intended for a left-drive vehicle market, such as the United States, and vice versa for vehicles intended for right-drive vehicle markets, such as the United Kingdom); "exterior" refers to a direction or position outwardly of the passenger compartment; and "inward" or "interior" refers to a direction in or into the passenger compartment of the vehicle. An "exposed surface" means a surface which is exposed to plain view from outside the vehicle. It should be understood in this regard that window assemblies of the invention can be adapted for use in any orientation and for architectural and other applications in addition to motor vehicle applications.

DETAILED DESCRIPTION OF CERTAIN PREFERRED EMBODIMENTS

As indicated above, the following detailed description focusses on a window assembly intended for use as a rear window in a pickup truck or the like. As is well known in the motor vehicle industry, rear window assemblies for pickup trucks frequently comprise one or more fixed panes, together with a centrally mounted slider pane. In the embodiment herein described, there is a right-hand fixed position pane and a left-hand fixed position pane, along with a centrally mounted slider pane. The fixed positions panes are not openable. In contrast, the slidably mounted center pane can be locked in a closed position, in which the window fully seals the window opening, or can be slid horizontally (to the right in the embodiment illustrated) to an open or partially open position.

Referring now to the drawings, the window assembly 10 is seen to comprise a full-circumference one-piece molded plastic single-sided frame 12. The frame is full-circumference in the sense that it forms an unbroken ring of molded plastic material about the outer perimeter of the assembly. The continuous one piece frame is advantageous in facilitating mounting and sealing within a window recess provided by the sheet metal 14 of the surrounding vehicle body panels. Such mounting can be accomplished, for example, by adhesive, mounting screws or other mechanical fasteners, or, preferably, both. In the illustrated embodiment, mounting adhesive 16 is shown schematically at the surface-to-surface interface of the frame 12 and sheet metal 14. The frame member can be formed of any suitably strong and resilient curable polymeric material, such as polyvinylchloride (PVC), polyurethane, and other materials which will be apparent to those who are skilled in the art in view of the present disclosure. Preferably, the frame 12 is formed by reaction injection molding (RIM) in an assembly aspect of the invention further discussed below.

Figure 8:
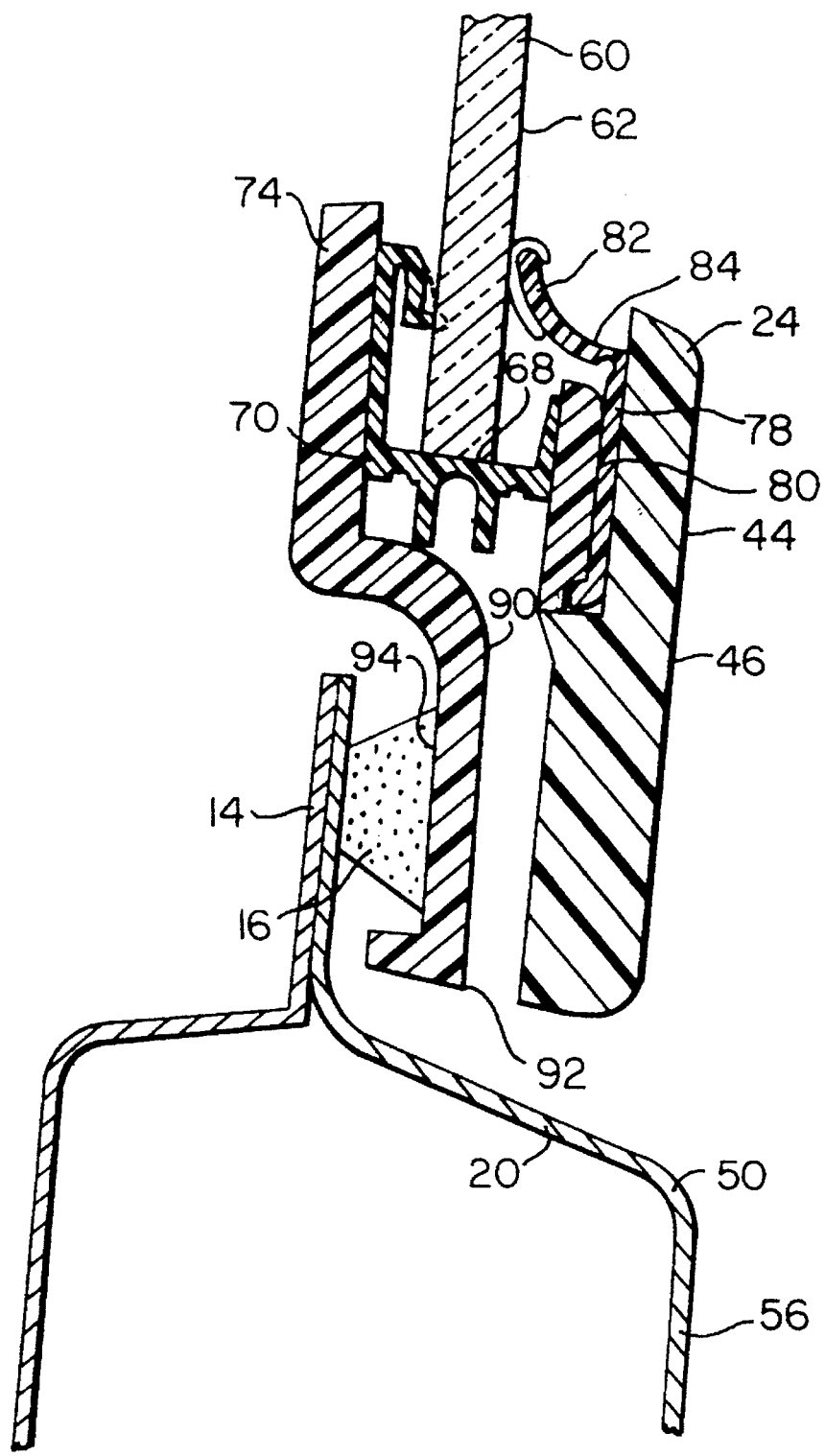
FIG. 8 is an enlarged schematic section view taken through line 8—8 of FIG. 1.

Advantageously, weather sealing is enhanced by radially outward extending seal member 18. In the preferred embodiment illustrated, weather seal 18 is unitary with the main body of frame 12 in the form of a "hidden lip" seal. That is, unitary seal 18 extends radially outward from frame 12 to the adjacent sidewall 20 of the window recess formed by the sheet metal of the vehicle body panel. The hidden lip extends radially outward from the main portion of the frame 12, preferably in a substantially unbroken full-circumference around the window assembly. The weather seal may be interrupted for drainage purposes, as discussed below in connection with FIG. 8. It can be seen to be recessed inwardly, so as not to interfere with the flush appearance provided by the fixed panes of the assembly and the exposed exterior surface portions of the appliques, as now further described.

As best seen in FIGS. 2 through 6, 8, 10 and 11, the window assembly comprises an upper applique 22 and a substantially mirror image lower applique 24, each of which is structurally integrated with the frame member 12. More specifically, upper applique 22 extends horizontally along the upper horizontal portion of frame 12. It comprises a left-hand lateral extension 28 which is fully embedded or enveloped within frame 12 above the left-hand fixed position pane 26. Similarly, it has a right-hand lateral extension 30, which is enveloped within frame 12 above right-hand fixed position pane 32. The lateral extensions each have voids in the preferred form of through-holes 34. The moldable material of frame 12 enters these voids during the molding process to form a mechanical interlock of the applique to the frame. Similarly, lower applique 24 has left-hand lateral extension 36 and right-hand lateral extension 38, each provided with voids 34 to form such mechanical interlock with the frame 12.

Advantageously, the appliques contribute substantial structural integrity, strength and rigidity to the window assembly. Particularly in accordance with preferred embodiments having the aforesaid mechanical interlock, frame 12 in combination with the appliques is sufficiently resistant to torsional and bending strains encountered in normal handling and installation operations to maintain the integrity of its adhesive bonding to the fixed panes and other components.

Applique 22 further comprises a center portion 40 which provides an exposed exterior surface 42 of the window assembly. Surface 42 is a "show surface" of the window assembly. That is, it is exposed to ordinary view from outside the vehicle and, accordingly, must meet surface appearance specifications established by the motor vehicle manufacturer for the particular application. Significantly, exposed exterior surface 42 is substantially flush with the curved plane of fixed panes 26 and 32. In a typical application, for example, surface 42 of the upper applique may be recessed two millimeters or less from the curved plane established by the exterior surface of the fixed panes, which is found to provide to the ordinary observer a substantially flush overall appearance. Similarly, lower applique 24 has a center portion 44 providing an exposed exterior surface 46 which is similarly substantially flush with the curved plane established by the exterior surfaces of the fixed panes, again providing a substantially flush overall appearance.

Figure 5:
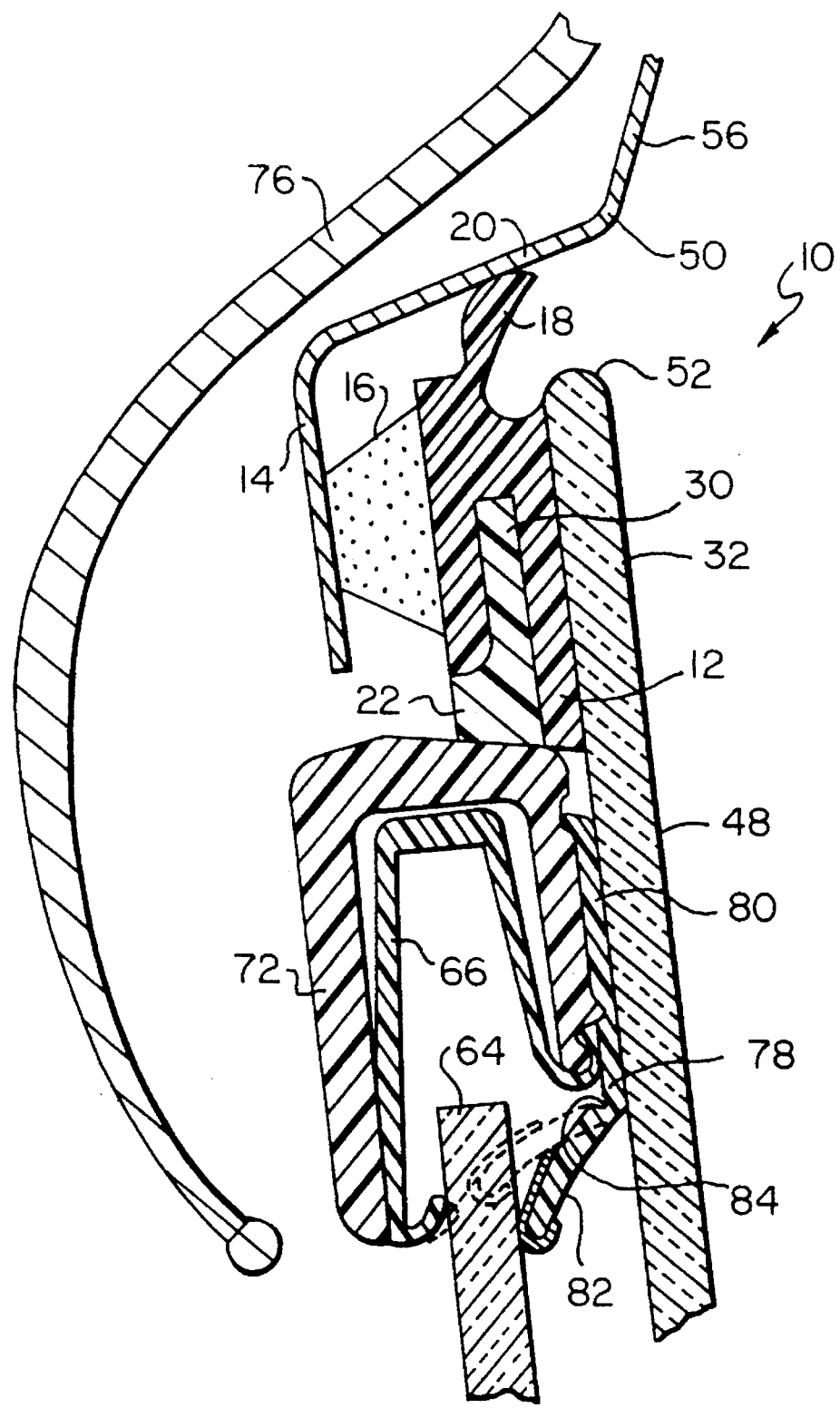
FIG. 5 is an enlarged schematic section view taken through line 5—5 of FIG. 1.

As best seen in FIG. 5, right-side fixed pane 32 has exterior surface 48 which is substantially flush with sheet metal 14 at the point 50 where it begins to form the window opening recess 20. In a typical application, the gap between raw edge 52 of fixed pane 32 (and the corresponding gap between the raw edge of fixed pane 26 and the adjacent sheet metal) would appear quite small. Thus, in plan view as seen in FIG. 1, the exposed exterior show surfaces 42 and 46 of the upper and lower appliques, respectively, together with the exterior surface 48 of fixed pane 32 and exterior surface 54 of fixed pane 26 form, in combination, a substantially flush extension of the vehicle body sheet metal at recess periphery 56 prior to the point 50 at which it begins to form the window opening recess 20. Again, substantially flush is intended to mean a sufficiently close curvoplaner extension from one surface to another to provide a substantially flush appearance to an ordinary observer and/or to meet the motor vehicle manufacturer's specifications for flushness. This flush extension of the sheet metal extends full-circumference around the perimeter of window assembly 10.

As indicated above, window assembly 10 further comprises a slidably mounted pane 60. It can be seen that the exterior surface 62 of sliding pane 60 is not flush with the fixed panes and the exposed exterior surfaces of the appliques. Like the fixed panes, the center pane 60 is transparent, that is, sufficiently transparent for use as a windowpane for the intended application. The panes may, for example, be half-mirrored, smoked, shaded, film-coated or otherwise rendered less than perfectly clear, while maintaining transparency sufficient for use as a rear window of a motor vehicle. Each of the panes may be formed of a single layer of glass or suitable plastic, or as a laminate of several layers.

Center pane 60 is seen to have upper peripheral edge 64 received in horizontally extending upper runner 66, which forms a downwardly open U-shaped channel. It should be understood that the term "U-shaped" is used here broadly to mean any generally concave cross-sectional configuration. The base between the two legs of the U-shape may be flat, rounded, raised to form a pedestal (thereby forming, e.g., a W-shape), etc. Correspondingly, lower peripheral edge 68 is received in a horizontally extending lower runner 70. The upper and lower runners preferably are formed of molded plastic, most preferably extruded polypropylene or the like. Alternative materials will be readily apparent to those skilled in the art in view of the present disclosure.

Upper runner 66 is mounted in upper backplate 72. Specifically, upper backplate 72 forms a downwardly open U-shaped recess in which upper runner 66 is fixed. Lower runner 70 is similarly mounted within upwardly open lower backplate 74. Due to the natural downward curvature toward the lateral ends of the upper horizontal reach of window assembly 10, upper peripheral edge 64 of sliding pane 60 preferably is somewhat beveled, as best seen in FIG. 1. That is, upper edge 64 is lower at its right side than at its left side, so as to be easily received as the window is slid to the right where the upper reach of the window assembly is lower.

Figure 6:
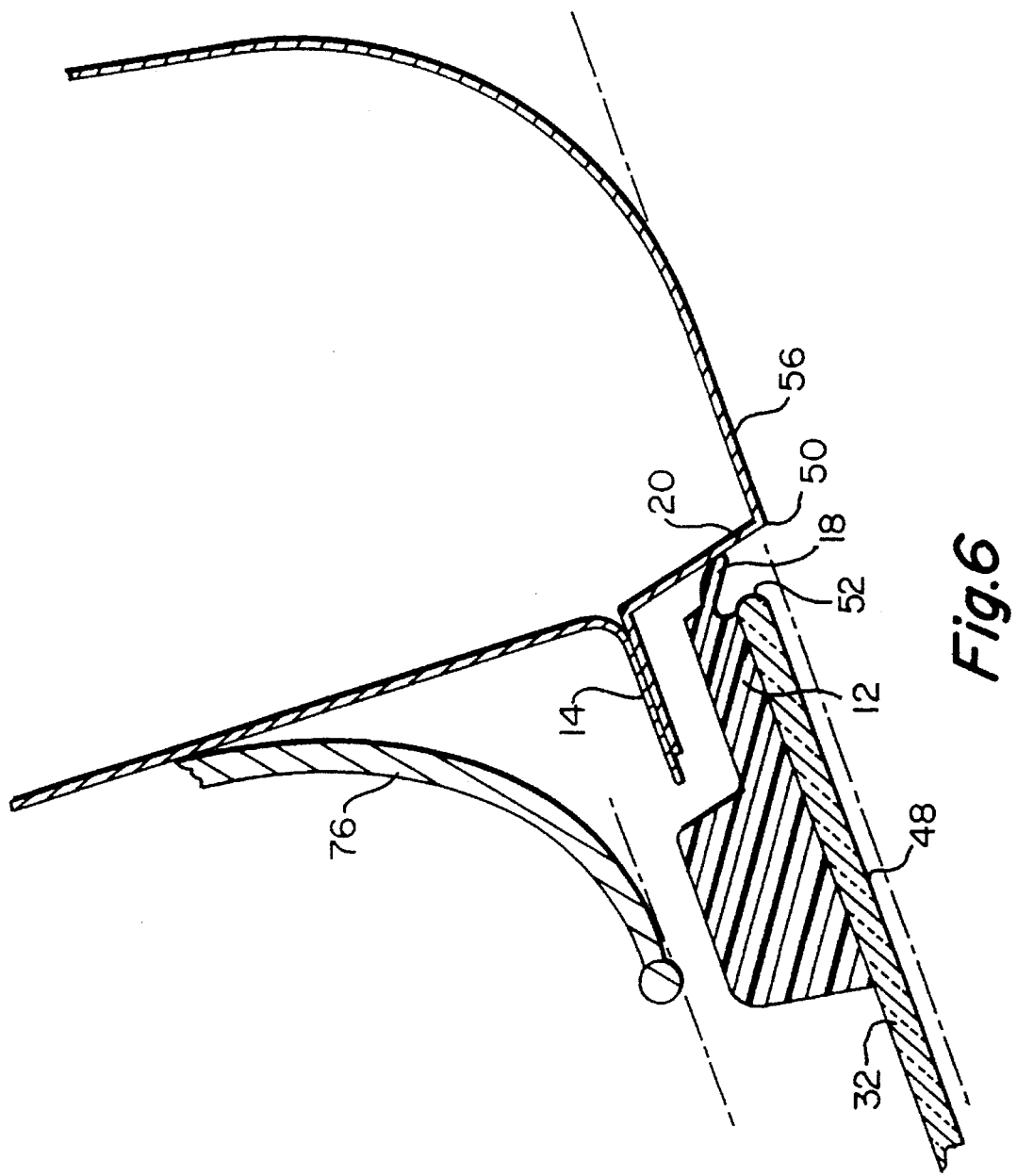
FIG. 6 is an enlarged schematic section view taken through line 6—6 of FIG. 1.
Figure 9:
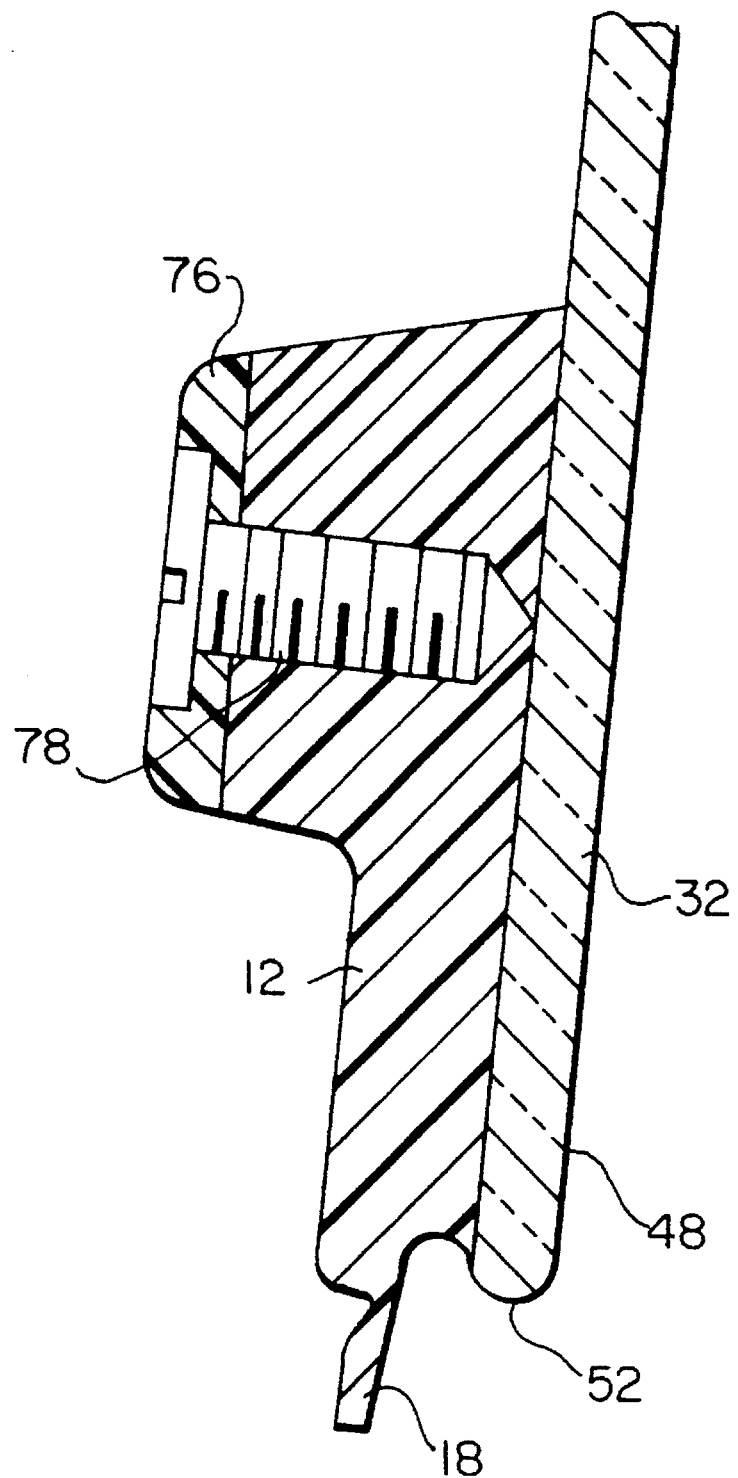
FIG. 9 is an enlarged schematic section view taken through line 9—9 of FIG. 1.

The upper and lower backplates in typical applications will be hidden from view within the passenger compartment of the vehicle by interior trim 76 shown in FIGS. 5 and 6. The backplates preferably are formed of molded plastic. For added strength and rigidity of assembly 10, one or both backplate members can be formed of glass fiber reinforced nylon, although numerous suitable alternative materials will be readily apparent to those skilled in the art in view of the present disclosure. The backplate members can be attached to the frame member 12 and/or the appliques 22, 24 in any suitable manner, including adhesive and by mounting screws, rivets, etc. As seen in FIG. 9, lower backplate 74 is attached to frame member 12 by mounting screw 78. Additional such mounting screws are spaced along the upper and lower backplates.

Figure 7:
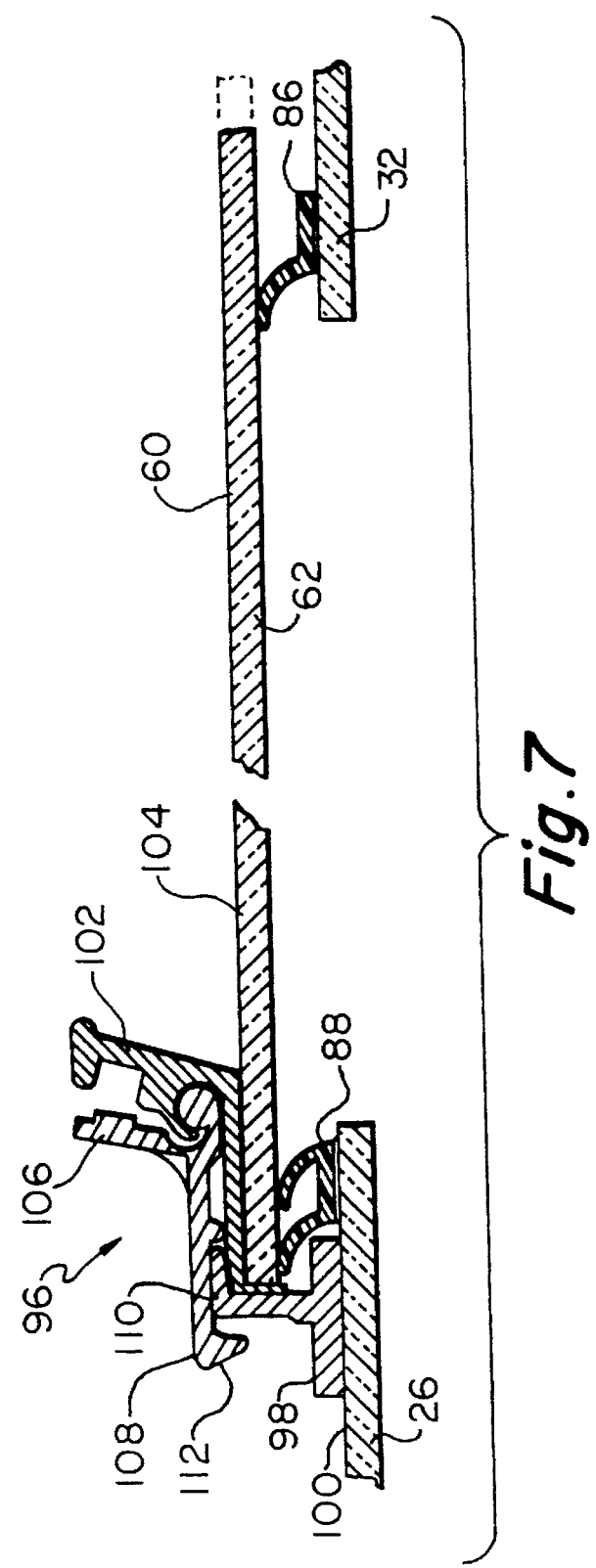
FIG. 7 is an enlarged schematic section view taken through line 7—7 of FIG. 1.

To ensure a good noise and weather seal, sealing means are provided about the perimeter of the center opening. Specifically, in the illustrated embodiment a resilient seal 78 is provided, preferably comprising EPDM, most preferably flocked EPDM, as known to those who are skilled in this area of technology. As best seen in FIGS. 2 through 5 and 8, the upper and lower horizontally extending portions of seal 78 has a mounting portion 80 captured between the backplate and the applique. A second portion of the seal, sealing flange 82, is resiliently biased into contact with exterior surface 62 of sliding pane 60. It can be seen that in the preferred embodiment illustrated a recess 84 is provided between the mounting flange 80 and the sealing flange 82 to facilitate flexing. As best seen in FIG. 7, seal 78 further comprises a left-hand vertically extending portion 86 and a right-hand vertically extending portion 88 which operate together with the horizontal portions of the seal to form a substantially complete perimeter seal to the exterior surface 62 of sliding pane 60 in its closed position. Nevertheless, in recognition of the inevitable infiltration of water and possibly other fluids into lower channel in which center pane 60 slides, lower backplate 74 advantageously provides one or more drain channels such as that illustrated in FIG. 8. Specifically, a drain channel 90 is seen to extend from the bottom of the U-shaped channel formed by lower backplate 74 downwardly to a lower point 92 substantially at the bottom of lower applique 24 and frame member 12. Drainhole 90 is extended downwardly in this fashion by drain flange 94 to insure that it remains unclogged by adhesive 16 used to affix the frame to the sheet metal 14 during the installation process.

Referring again to FIG. 7, a locking latch 96 is seen to be provided for locking center pane 60 in its closed position. A first latch member 98 is attached, for example, by adhesive bonding, to the interior surface 100 of left-hand fixed pane 26. Second latch member 102 is affixed, also preferably by adhesive bonding, to the inside surface 104 of slider pane 60. Latch member 102 carries movable member 106 which has latching end 108 biased in counter-clockwise direction (as viewed in FIG. 7), so as to remain naturally in locking engagement with latch flange 110 of latch member 98. Latch end 108 of movable member 106 has a beveled face 112 which will cause movable member 106 to rotate clockwise (as viewed in FIG. 7) when pane 60 is slid into its closed position, thereby automatically riding up and over latching flange 110. Once past latching flange 110, latching end 108 will snap down into a locking position to secure the pane 60 in its; closed position.

It should be recognized that in certain preferred embodiments, such as that illustrated in the drawings, the frame member provides no intermediate vertical members or supports. In such embodiments, the bonding of the frame member to the fixed panes adds to the structural integrity of the assembly, and the appliques provide an important structural bridging function between the right-hand and left-hand side of the assembly, such that in combination the assembly is sufficiently rigid and durable to withstand the torsional and bending forces encountered in transportation, installation and use. The appliques, therefore, can be seen to provide both structural strength to the overall window assembly and exposed exterior "show surfaces" in the installed assembly.

In accordance with a novel assembly or fabrication aspect, the window assembly is produced by first positioning fixed panes 26, 32 along with the upper and lower appliques 22, 24 into a molding cavity. These components are placed in the molding cavity in the position and orientation, relative each other, which they will have in the final window assembly. Thus, the exterior surfaces 42, 46 of the upper and lower appliques, respectively, are positioned between the two fixed panes and substantially flush with their exterior surfaces. Other components may, of course, also be positioned in the molding cavity at this time. The molding cavity is then closed and curable polymeric material, such as any of those discussed above, is introduced into the molding cavity to form a full circumference single-sided frame which at least partially envelopes the appliques and forms adhesive surface bonding contact with a perimeter portion of the interior surface of the fixed position panes. In accordance with the principles disclosed above, the appliques may have lateral extensions which are fully enveloped by the polymeric material, preferably with voids, such as through-holes, to form a mechanical interlock with the polymeric material. Also in accordance with the principles discussed above, the polymeric material does not contact or overflow the peripheral edge surfaces or the exterior surfaces of the fixed panes.

The polymeric material is at least partially cured in the molding cavity to form a sufficiently self-supporting sub-assembly comprising the fixed position panes and the appliques integrated with the single-sided frame. The molding cavity can then be opened and the sub-assembly removed for further assembly steps. The upper and lower backplates can be added at this time, along with the upper and lower run channels and weather seals.

It will be appreciated by those who are skilled in this area of technology that the numerous structural advantages discussed above can be achieved in the aforesaid manufacturing process, wherein a full-circumference one-piece molded plastic single-sided frame is formed in a single molding step in which it is simultaneously integrated with substantially the entire exterior flush surface of the final window assembly. In adding structural integrity to the assembly, as well as an exterior show surface, the appliques permit the frame member to be lighter weight, with resultant material cost savings. These and additional advantages will be readily apparent in view of the foregoing disclosure.

Those who are skilled in this area will recognize that various modifications and alternative embodiments are possible within the true scope and spirit of the invention. The appended claims are intended to cover all such modifications and alternative embodiments.

We claim:

1. A window assembly for mounting in a recessed window opening, the window assembly comprising a transparent fixed position pane having an interior surface, an exterior surface and a peripheral edge surface, a transparent sliding pane, and mounting frame means for integrating the window assembly comprising:

a full-circumference, molded plastic single-sided frame member slidably mounting the sliding pane and supporting the fixed position pane by adhesive surface bonding to a perimeter portion of the interior surface of the fixed position pane, the peripheral edge surface and the exterior surface of the fixed position pane being free of adhesive surface bonding to the single-sided frame member; and an exposed exterior surface substantially flush with the exterior surface of the fixed position pane.

2. The window assembly in accordance with claim 1 wherein the slidably mounted pane is manually slidable between its open position and its closed position.

3. A window assembly for mounting in a recessed window opening, the window assembly comprising a transparent fixed position pane having an interior surface, an exterior surface and a peripheral edge surface, a transparent sliding pane, and mounting frame means for integrating the window assembly comprising;

a full-circumference, molded plastic single-sided frame member slidably mounting the sliding pane and supporting the fixed position pane by adhesive surface bonding to a perimeter portion of the interior surface of the fixed position pane, the peripheral edge surface and the exterior surface of the fixed position pane being free of adhesive surface bonding to the single-sided frame member;

an exposed exterior surface substantially flush with the exterior surface of the fixed position pane; and a horizontally extending elongate upper applique, wherein the exposed exterior surface comprises an exterior surface portion of the upper applique, the upper applique having unitary portions extending laterally of the exterior surface portion and embedded in an upper horizontal section of the single-sided frame member.

4. The window assembly in accordance with claim 3 wherein the mounting frame means further comprises a horizontally extending elongate lower applique and the exposed exterior surface comprises an exterior surface portion of the lower applique, the lower applique having unitary portions extending laterally of the exterior surface portion and embedded in a lower horizontal section of the single-sided frame member.

5. The window assembly in accordance with claim 4 wherein the unitary portions embedded in the single-sided frame are interlocked with the single-sided frame member via voids in the lateral extensions filled with molded material of the single-sided frame member.

6. The window assembly in accordance with claim 1 wherein the single-sided frame member comprises a flexible weather seal lip unitary therewith, which extends radially outward beyond the peripheral edge surface of the fixed position pane and is recessed inwardly behind the plane of the exterior surface of the fixed position pane.

7. The window assembly in accordance with claim 6 wherein the whether seal lip extends radially outward from the single-sided frame member in a full circumference.

8. A window assembly for mounting in a recessed window opening, the window assembly comprising a fixed position pane which is transparent and has an interior surface, an exterior surface and a peripheral edge surface, a transparent, slidably mounted pane which is horizontally slidable between a closed position laterally adjacent the fixed position pane and an open position, and mounting frame means comprising:

a full-circumference, molded plastic single-sided frame member supporting the fixed position pane by adhesive surface bonding to a perimeter portion of the interior surface of the fixed position pane, with the peripheral edge surface and the exterior surface of the fixed position pane being free of adhesive surface bonding to the single-sided frame member;

an upper exposed exterior surface which extends horizontally above the slidably mounted pane in its closed position, and is substantially flush with the exterior surface of the fixed position pane;

a lower exposed exterior surface which extends horizontally below the slidably mounted pane in its closed position and is substantially flush with the exterior surface of the fixed position pane;

a horizontally extending upper channel which slidingly receives an upper peripheral edge of the slidably mounted pane; and a horizontally extending lower channel which slidingly receives a lower peripheral edge of the slidably mounted pane.

9. A window assembly for mounting in a recessed window opening, comprising:

a transparent right-side fixed position pane having an interior surface, an exterior surface and a peripheral edge surface, a transparent left-side fixed position pane having an interior surface, an exterior surface and a peripheral edge surface, a transparent center pane which is horizontally slidable from a closed position in which it is substantially laterally centered between the fixed position panes and an open position; and mounting frame means for mounting the fixed position panes and the center pane, comprising:

a full-circumference, one-piece, molded plastic single-sided frame member supporting the fixed position panes and the center pane, a perimeter portion of the interior surface of each fixed position pane being adhesively surface bonded to the frame member, with the peripheral edge and the exterior surface of each fixed position pane being completely free of adhesive surface bonding to the single-sided frame member;

an upper applique fixed to an upper horizontal section of the single-sided frame member and providing substantial structural strength and rigidity to the window assembly, extending horizontally from above the right-side fixed position pane to above the left-side fixed position pane, having a center portion with an exposed exterior surface which extends between the right-side fixed position pane and the left side fixed position pane, and structurally supporting a horizontally extending upper channel member which slidingly receives an upper peripheral edge of the center pane; and a lower applique fixed to a lower horizontal section of the single-sided frame member, extending horizontally from below the right-side fixed position pane to below the left-side fixed position pane, having a center portion with an exposed exterior surface which extends between the right-side fixed position pane and the left side fixed position pane, and structurally supporting a horizontally extending lower channel member which slidingly receives a lower peripheral edge of the center pane, the exposed exterior surfaces of the center portions of the upper and lower appliques each being substantially flush with the exterior surface of the right-side and left-side fixed position panes.

10. The window assembly in accordance with claim 9 further comprising:

an upper backplate affixed to the upper horizontal section of the single-sided frame member, defining a downwardly open, horizontally extending channel receiving an upper runner which receives an upper peripheral edge of the center pane, and a lower backplate affixed to the lower horizontal section of the single-sided frame member defining an upwardly open, horizontally extending channel receiving a lower runner which receives a lower peripheral edge of the center pane.

11. The window assembly in accordance with claim 10 wherein the lower backplate provides a downwardly extending drain flange for a drain hole in the lower channel member.

12. A method of making a window assembly comprising fixed and slidably mounted panes, for flush mounting in a recessed window opening, the method comprising:

positioning within a molding cavity a transparent right-side fixed position pane having an interior surface, an exterior surface and a peripheral edge surface, a transparent left-side fixed position pane having an interior surface, an exterior surface and a peripheral edge surface, an upper applique having a center portion positioned between the right-side fixed position pane and the left-side fixed position pane, a right-side lateral extension along an upper portion of the right-side fixed position pane, and a left-side lateral extension along an upper portion of the left-side fixed position pane, and a lower applique having a center portion positioned between the right-side fixed position pane and the left-side fixed position pane, a right-side lateral extension along a lower portion of the right-side fixed position pane, and a left-side lateral extension along a lower portion of the left-side fixed position pane, an exterior surface of the center portion of each applique being substantially flush with the exterior surfaces of the fixed position panes;

closing the molding cavity;

introducing curable polymeric material into the molding cavity to form a full-circumference, single-sided frame member which at least partially envelopes the lateral extensions of the appliques and forms adhesive surface bonding contact with a perimeter portion of the interior surface of the fixed position panes, leaving the exterior surfaces of the center portions of the appliques and the exterior and peripheral edge surfaces of the fixed position panes all free of contact with the polymeric material;

at least partially curing the polymeric material to form a self-supporting sub-assembly comprising the fixed position panes and the appliques integrated with the single-sided frame member; and opening the molding cavity and removing the sub-assembly.

\* \* \* \* \*